J. R. GAMMETER.
METHOD AND APPARATUS FOR MAKING CUSHION TIRES.
APPLICATION FILED JUNE 11, 1920.
1,425,085.
Patented Aug. 8, 1922.
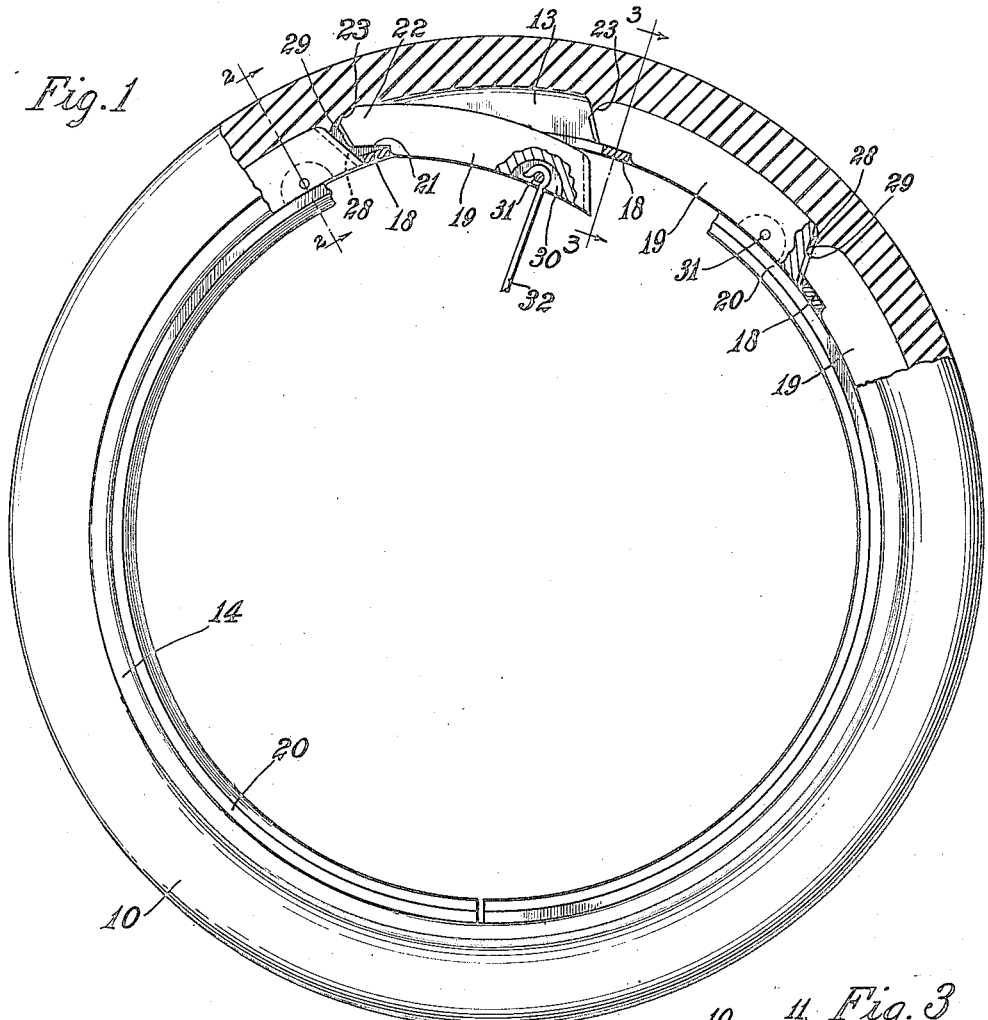
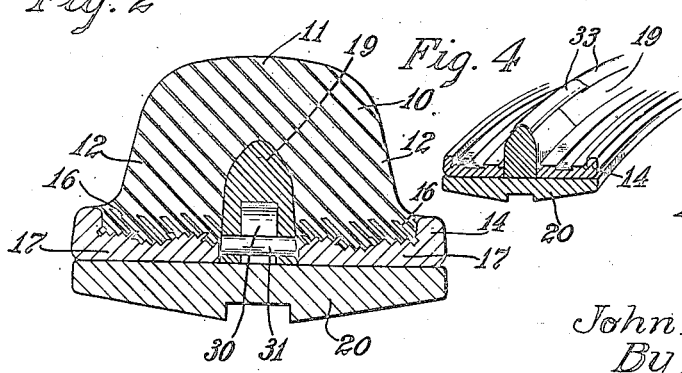
Inventor
John R. Gammeter
By Robert M. Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING CUSHION TIRES.

1,425,085.  Specification of Letters Patent.  Patented Aug. 8, 1922.

Application filed June 11, 1920. Serial No. 388,090.

*To all whom it may concern:*

Be it known that I, JOHN R. GAMMETER, a citizen of the United States, residing at Akron, in the county of Summit and State of Ohio, have invented a certain new and useful Method and Apparatus for Making Cushion Tires, of which the following is a specification.

This invention relates to the art of making a cushion tire having a metal base to which the rubber cushion is fastened during the process of manufacture, and its principal objects are to provide an improved method and apparatus for building a tire with recesses or channels in its inner wall and to provide an improved base for supporting the rubber cushion. Further specific objects will become apparent hereinafter.

Of the accompanying drawing:

Fig. 1 is a side view, partly in elevation and partly in section, of my tire, and an apparatus embodying and adapted to carry out my invention.

Fig. 2 is a transverse sectional view thereof taken on the line 2—2 of Fig. 1.

Fig. 3 is a transverse sectional view of the tire taken on the line 3—3 of Fig. 1 with the molding apparatus removed.

Fig. 4 is a perspective view of a portion of a modified form of apparatus.

In these drawings I have shown a tire 10 having a rubber cushion comprising a tread 11, and continuous tread supporting side walls 12 on either side of a circumferential channel 13, a metal base 14 having circumferentially aligned slots 15, and layers of hard rubber 16 between the continuous side members 17 of the metal base and the base portions of the side walls of the cushion, said hard rubber interlocking with the usual undercut ridges formed on the base, as shown in the drawings. Webs or bridges 18 at the ends of the slots 15 unite the two sides of the metal base and act as spacing means preventing a relative displacement of these sides during the manufacture and use of the tire.

In Figs. 1 and 2 I have shown the apparatus for molding the channel 13 in the inner wall of the tire. This apparatus has a series of arcuate core sections 19 resting on an inner split ring 20 forming a part of the mold (not necessary to show herein) in which the tire is cured. Each of these sections 19 is longer than one of the slots and has a recess 21 in its inner wall adjacent one end 22 of the section to receive one of the webs 18, the remaining wall on this side of the section having a length and width substantially equal to that of a slot. The outer wall at this end of each section is curved inwardly as shown at 23 to decrease the effort required to turn a core section about a bridge 18 when removing the section from a cured tire. The adjacent ends of two sections meet in a non-radial line and are keyed together by a groove 28 in the end of one section and a tongue 29 in the end of the next section to prevent a relative transverse angular movement of the sections on the split ring, the tongue preferably fitting tightly in the groove to hold the sections together when they are assembled. In the inner wall of each section adjacent the opposite end thereof from the recess 21 is a pocket or recess 30, and a pin 31 extending across the latter and secured to the side walls of the pocket. A hook 32 may be inserted in each of these pockets and engaged with the pin to rotate the sections inwardly of the base to remove the sections from the tire. As is shown in cross section in Fig. 2 the core is widest at its base and gradually tapers toward the tread to facilitate the removal of the core sections through the slots.

To supplement the frictional engagement of the tongues in the grooves in holding the core sections in position on the ring 20, a strip of straight-laid rubberized tape 33 may be wound around the outer periphery of the assembled sections, as shown in Fig. 4, and the ends of the tape overlapped, the tacky surface of the tape holding the latter in position on the core and preventing a separation of the tape ends. The tape is vulcanized to the rubber during the curing of the tire and may be left in the latter when the core sections are removed.

In my preferred method of building a tire the hard rubber composition is first applied to the metal base and the middle of this layer is cut away to uncover the slots and remove the rubber from the outside of the bridges 18. The metal base is then laid on its side, the inner ring is forced inside the base, the sections with the exception of one called a key section, are placed in the slots, the free ends of the sections adjacent the empty slot are moved outwardly, the key section is fitted between these free ends, and the sections are forced inwardly until they rest on the split ring. If the tape is used, it is then wound around the core. The assembled ring, tire base and core are then mounted in a vertical position and rotated, and the successive layers of the side walls and tread are wound or otherwise built up on the hard rubber layer. The tire is then placed between rigid mold members, such as are commonly used in curing solid tires, and vulcanized under molding pressure, the pressure on the heat of vulcanization uniting the layers of rubber and the metal base. After the tire is cured, the outer mold members and the inner mold ring are removed and the sections of the core are pulled through the slots by inserting the hook 32 into each of the recesses 30 and pulling inwardly on the pins 31 to rotate the sections about the bridges 18.

The mold sections may be assembled in various other ways as, for example, by first placing the sections in the slots from either side of the latter with the exception of a key section which is fitted into place from the inside of the base, and then forcing the split ring inside the latter. The order of the steps of assembling and building the tire may also be varied by assembling the core, metal base and inner ring before the hard rubber layers are applied, and then winding the layers of the different rubber compositions on in succession, this method of manufacture having the advantage that the layers of hard rubber composition are still warm from the action of the calender rolls from which the rubber is fed onto the base when the soft rubber composition is wound on, giving greater adhesion between the two kinds of rubber in the tire.

The finished tire combines the advantages of a cushion or hollow tire with those of a tire having an integral metal base with the tire body vulcanized thereon, thus presenting a highly improved article.

By reason of the openings through the base in communication with the hollow space within the tire body it has the further advantage that internal ventilation of the tire is provided, especially when the tire is used, as it may be, upon a perforated felly or a felly otherwise designed to admit the free passage of air to and from the tire cavity. Another advantage of the structure shown shown is that the slots permit independent flexibility of the respective side members or portions of the base, which allows the base to accommodate itself to the contour of the felly even though the latter be somewhat imperfect as to form.

The cushion tire herein disclosed is made the subject of a separate application, Serial No. 508,969, filed by me October 20, 1921, patented March 28, 1922, No. 1,410,669.

I claim:

1. The method of making cushion tires which comprises assembling a core member with an integral, perforate tire base, building a rubber tire body on the base, over said core member, permanently uniting it with the base by vulcanization, and withdrawing said core member through an opening in the base.

2. The method of making cushion tires which comprises assembling a sectional core structure annularly on an integral tire base having a series of openings for the passage of the core sections, building a rubber tire body on the base, over said core structure, permanently uniting it with the base by pressure and vulcanization, and withdrawing the core sections through the openings in said base.

3. The method of making cushion tires which comprises forming an annular tire base with openings and intervening, integral bridges, assembling therewith a sectional core, building a rubber tire body on the base, over said core structure, permanently uniting it with the base by pressure and vulcanization, and withdrawing the core sections through said openings.

4. The method of making cushion tires which comprises applying to a tire base having openings and intervening bridges a layer of hard-rubber compound which substantially covers the base except on the bridges, assembling a plurality of core sections with said base and causing them to overlap the bridges, building a rubber cushion tire body on said hard-rubber layer, over the core sections, permanently uniting the hard rubber to the base and to the tire body by pressure and vulcanization, and withdrawing the core sections through said openings.

5. The method of making cushion tires which comprises applying to a tire base having longitudinal slots and intervening bridges a layer of hard-rubber compound covering substantially the whole of the base, removing that portion of said layer which overlies the slots and bridges, assembling with said base a plurality of core sections and seating them by one end on the respective bridges, building a rubber cushion tire body on said hard-rubber layer, over the core sections, permanently uniting the tire elements and the base by pressure and vulcanization, and withdrawing the core sections through said slots.

6. The method of making cushion tires which comprises forming an annular tire base with rubber-anchoring projections on its outer periphery, and with alined longitudinal slots separated by integral bridges, assembling therewith a substantially continuous, sectional core structure with the ends of its sections seated on said bridges, applying to the outer periphery of the base, on both sides of the core structure, a layer of hard-rubber composition, building a rubber cushion tire body on said layer, over the core structure, permanently uniting the elements of the tire and the base by pressure and vulcanization, and withdrawing the core sections through said slots.

7. Cushion-tire-making apparatus comprising a ring adapted to be incorporated in the tire, said ring having means for permanently uniting it with the plastic rubber of the tire during vulcanization, and being formed with an annular series of openings separated by bridges, and a series of core sections assembled with said ring and adapted to be withdrawn inwardly through said openings.

8. Cushion-tire-making apparatus comprising a ring adapted to form the permanent base of the tire and having undercut projections on its outer periphery for interlocking with the hard rubber of the tire body, said ring being formed with alined circumferential slots separated by integral bridges, and a series of core-sections forming a substantially continuous core structure and having portions occupying said slots.

9. Cushion-tire-making apparatus comprising a tire base formed with slots and intervening integral bridges, and a series of core sections occupying the slots and having end portions overlapping the bridges and adapted to pivot thereon for the purpose of withdrawing them from the vulcanized tire.

10. Cushion-tire-making apparatus comprising a tire base formed with openings and intervening bridges, and core sections occupying said openings, each said section having at one end a seating portion engaging one of the bridges and having adjacent its opposite end a member exposed on the inner periphery of said section for engagement by a removing tool.

11. Apparatus for making a cushion tire comprising an annular metal base formed with an aligned series of circumferential slots separated by bridges, a plurality of core sections each of which is adapted to project outward through a slot and overlap one of the bridges, and means for holding said core sections in assembled position with respect to the base.

12. Apparatus for building cushion tires comprising a plurality of core-members adapted to be arranged in a circular series about a tire-base with parts of said sections extending outward beyond said base through openings therein, and a ring adapted to lie within the tire-base and hold the core members in position with respect thereto.

13. Apparatus for building cushion tires comprising a tire base having two side members permanently connected by a series of bridges, a substantially continuous core structure formed of sections withdrawable through the base between said bridges, and means on the inner periphery of the base for fixing the position of the core sections radially of said base.

14. A cushion tire building apparatus comprising circumferentially aligned core sections forming a continuous ring shaped core, cooperating means formed on the ends of the sections preventing relative transverse angular movements thereof, and removable means on the inner side of the core preventing inward displacement of the core sections.

15. A cushion tire building apparatus comprising circumferentially aligned core sections forming a continuous ring shaped core, means on the inner side thereof preventing inward displacement of the said sections, and a flexible member adapted to encircle the sections and prevent an outward movement of the latter.

In witness whereof I have hereunto set my hand this 4th day of June, 1920.

JOHN R. GAMMETER.